(No Model.) 2 Sheets—Sheet 1.
F. A. JONES.
PRESSURE INDICATING AND RECORDING GAGE.

No. 596,599. Patented Jan. 4, 1898.

WITNESSES
Chas. J. Gooding.
Wm. H. Varnum.

INVENTOR
Florentine A. Jones.

UNITED STATES PATENT OFFICE.

FLORENTINE A. JONES, OF MALDEN, MASSACHUSETTS.

PRESSURE INDICATING AND RECORDING GAGE.

SPECIFICATION forming part of Letters Patent No. 596,599, dated January 4, 1898.

Application filed November 2, 1894. Serial No. 527,706. (No model.)

*To all whom it may concern:*

Be it known that I, FLORENTINE A. JONES, of Malden, in the county of Middlesex and State of Massachusetts, have invented a new and useful Improvement in Pressure Indicating and Recording Gages, of which the following, taken in connection with the accompanying drawings, is a specification.

This invention relates to gages for indicating or recording pressure of the class wherein the gage mechanism is operated by a hollow spring-tube through the medium of intermediate power-transmitting devices, the invention being related more particularly to the last-mentioned mechanism or devices.

The object of the invention is to obtain a more perfect working of the gage, whereby the pressure may at all times and under all conditions be accurately indicated or recorded, to facilitate the placing and disposal of the necessary mechanism to the best advantage, and to provide for the required adjustment of the parts.

To these ends, therefore, the invention consists of the mechanism or devices which I shall now proceed to describe in detail and then point out in the claims hereto appended.

Reference is to be had to the accompanying drawings and to the letters marked thereon, similar letters indicating similar parts or features, as the case may be, wherever they occur.

Figure 1:
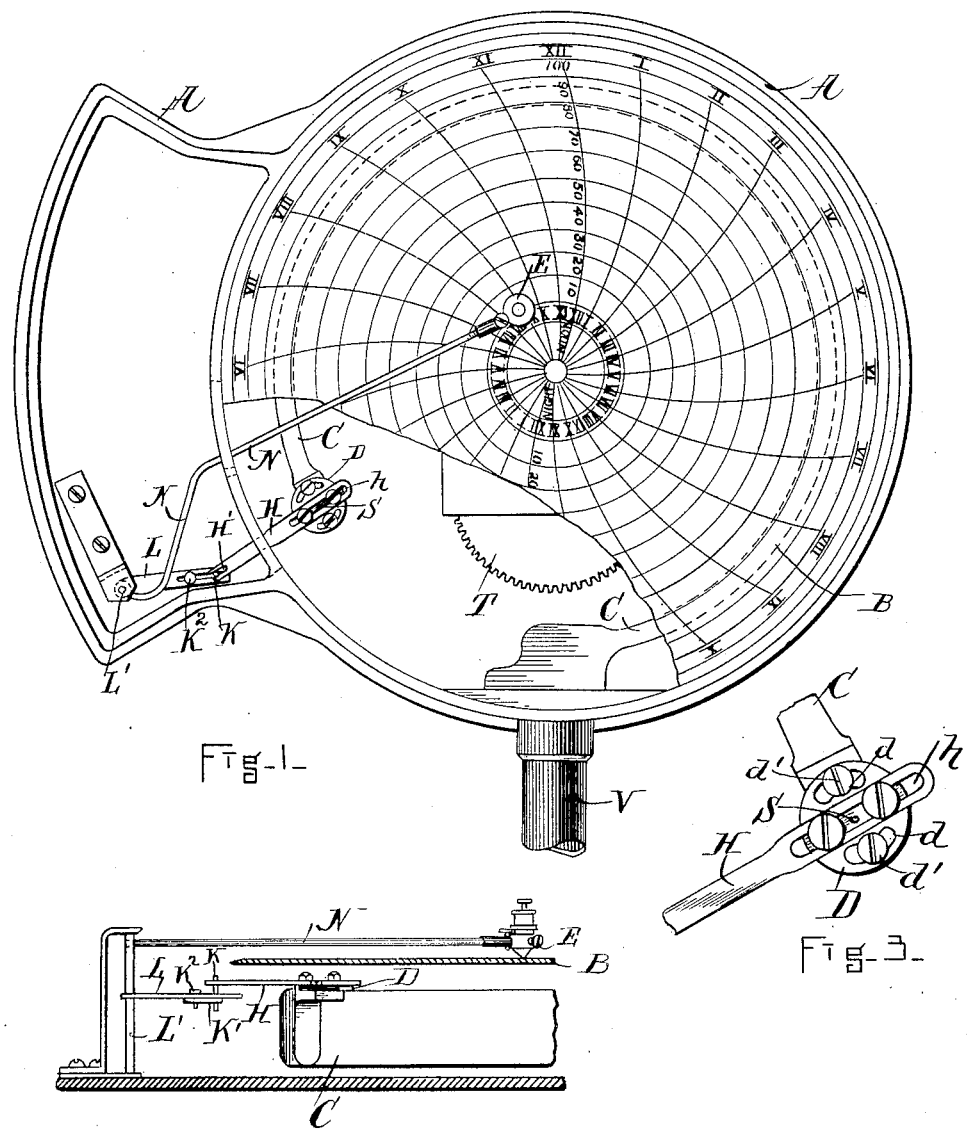
Figure 2:
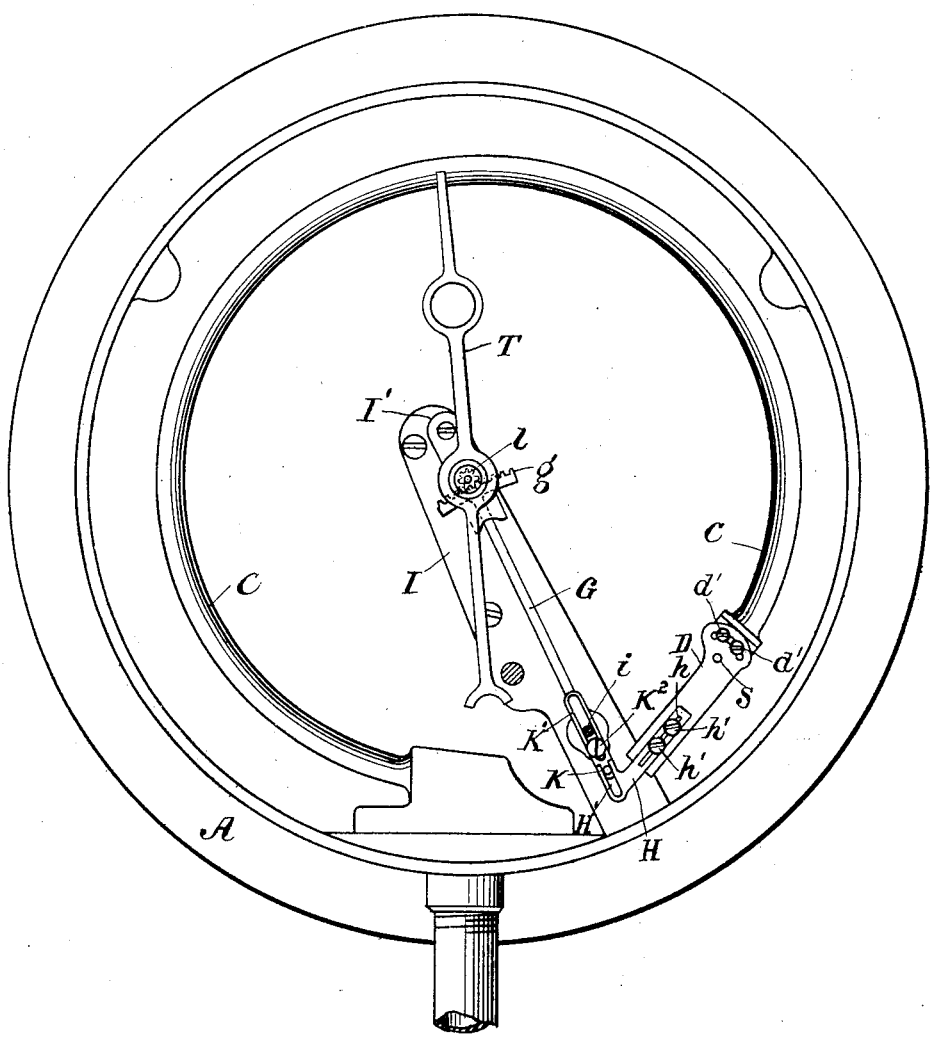

Of the drawings, Figure 1 is a plan view of a recording-gage equipped with my improvements, a portion of the chart or dial being broken away to show a portion of the internal mechanism. Fig. 2 is a plan view of an indicating-gage with the dial or scale removed, so as to disclose my improvements, which are added thereto. Fig. 3 is an enlarged view illustrating some of the details of my invention. Fig. 4 is a partial section through the recording-gage, so as to show the operating parts in side elevation.

Referring to the drawings and more particularly to Figs. 1, 3, and 4, A indicates the casing of a recording-gage, which is provided with the usual dial or recording-chart B. Within the casing is mounted a hollow spring-tube C, communicating with the inlet-pipe V and having on its free end a flattened tip to receive a supporting-plate D, which is pivoted thereon by means of the pin S. The said plate is provided with curved slots $d\ d$, through which set-screws $d'\ d'$ pass and are screwed into the end or tip of the tube C. The plate D is adjustable around the pivot S, being held or clamped in any desired position by the said screws $d'\ d'$, the large heads of which project over the edges of the curved slots.

H indicates a connecting-arm or extension having at one end an elongated longitudinal slot $h$ and adjustably attached to the supporting-plate G by two screws, which pass through the said slot. Thus it will be seen that by reason of the adjustability of the arm relatively to the supporting-plate and of the peculiar connection of the plate with the hollow tube the free end of the said arm H may be adjusted in all desired directions relatively to the said tube.

The arm H is provided at its free or outer end with a slot H', through which extends a projection or pin K, adjustably attached to the transmitting-arm L, extending from the arbor L'. The said pin K is directly attached to an adjusting-piece K', which is secured to the transmitting-arm L by a clamping-screw $K^2$, passing through a slot in the end of the transmitting-arm L, as pictured in Fig. 1, the said pin also projecting through the said slot for the purpose of holding the adjusting-piece K' rigid with the said arm L.

The arbor L' is journaled in suitable bearings (see Figs. 1 and 4) and has connected to it a lever N, which is provided with a marking or delineating device E, by means of which latter the pressure is recorded upon the dial B. The said dial B is revolved at a predetermined rate of speed in the usual manner by means of clockwork, of which a portion is indicated at T.

The marking device, the lever N, and its arbor, which I include in the term "gage mechanism," are well known.

From the foregoing it will be seen that the slightest movements of the outer or free end of the Bourdon or hollow tube C will be transmitted by the devices described to the arm N and that the variations in pressure will be duly recorded upon the chart or dial.

In Fig. 2 I have illustrated my invention as applied to an indicating, as distinguished from a recording, gage. In this case the pointer T is revolved by means of a pinion $l$ on the arbor thereof and a segmental rack G, pivoted at $i$ and having its teeth $g$ meshing with the pinion, the upper plate I' of the gage-movement being broken off to show the said parts.

Power is transmitted from the free end of the hollow spring-tube C by means of the following devices: The supporting-plate D is adjustably pivoted upon the free or outer end of the Bourdon tube C by means of the pivot S and the screws $d'$ $d'$, passing through a single curved slot $d$. The plate has an extension, into which clamping-screws $h'$ $h'$, passing through an elongated slot in a connecting arm or extension H, are threaded. The last-mentioned arm has a lateral slot H' in its free or outer end, through which passes a pin or projection K in the outer end of the adjusting-piece K'. The piece K' is adjustable relatively to the arbor of the segmental rack pivoted at $i$, since the segmental rack is provided at its rear with an extension or transmitting arm, on which is adjustably fixed the piece K' by means of the pivot $i$ and the clamping-screw K², both passing through a longitudinal slot in the piece K' and being threaded into the extension or transmitting arm of the segmental rack G.

Thus the parts are readily adjustable, and at the same time any motion of the end of the spring-tube is immediately communicated to the indicator or pointer T.

The pointer T and its arbor, together with the pinion $l$ and the segmental rack G, with its arbor, all of which I include in the term "gage mechanism," are also well known.

I have contemplated many modifications of the various parts, but those mechanisms hereinbefore described are the best now known to me for accomplishing the objects for which the invention is intended. Many and varied changes and modifications may be made, however, without departing from the spirit and scope of my invention.

I do not herein claim any of the subject-matter of the claims in my copending application, Serial No. 536,632, filed January 21, 1895; but What I do claim is—

1. A pressure-gage comprising a hollow spring-tube, a suitable gage mechanism, a supporting-plate rotatably adjustable on the end of the said spring-tube, means for holding the plate at any desired adjustment and a connecting-arm engaging the gage mechanism and longitudinally adjustable on said supporting-plate.

2. A pressure-gage, comprising a hollow spring-tube, having its free end flattened, suitable gage mechanism, a supporting-plate pivotally mounted on the flattened end of the tube and having a curved slot, a screw passing through the slot into the end of the tube to hold the plate at any desired adjustment, and a connecting-arm longitudinally adjustable on said supporting-plate, and connected to the gage mechanism.

3. A pressure-gage comprising a hollow spring-tube, suitable gage mechanism, a connecting-arm laterally and longitudinally adjustable on said tube, means for securing the arm at any desired adjustment, and a pin-and-slot connection between the connecting-arm and the gage mechanism.

4. A pressure-recording gage, comprising a hollow spring-tube; a plate D pivotally secured upon the end of said tube; recording mechanism comprising a lever N provided with a marking device, an arbor and a transmitting-arm L; and a connecting-arm longitudinally adjustable on said plate, and having a pin-and-slot connection with the said transmitting-arm of the gage mechanism.

5. A pressure-gage comprising a hollow spring-tube, a suitable gage mechanism, a supporting-plate rotatably adjustable on the end of the spring-tube, means for holding the plate at any desired adjustment, a connecting-arm secured to said plate and having its free end slotted, and a transmitting-arm connected with the gage mechanism and having a pin entering the said slot in the end of the said connecting-arm.

6. A pressure-gage comprising a hollow spring-tube, a suitable gage mechanism, a supporting-plate rotatably adjustable on the end of the spring-tube, means for holding the plate at any desired adjustment, a connecting-arm secured to said plate and having its free end slotted, a transmitting-arm connected with the gage mechanism, and a pin adjustably mounted on the transmitting-arm and entering the said slot in the end of the said connecting-arm.

In testimony whereof I have signed my name to this specification, in the presence of two subscribing witnesses, on this 1st day of November, A. D. 1894.

FLORENTINE A. JONES.

Witnesses:
WINTHROP B. HAMMOND,
EDWIN S. BLAINE.